United States Patent [19]

Weir

[11] 4,345,238
[45] Aug. 17, 1982

[54] SIGNALLING DEVICE FOR USE IN AUTOMOTIVE AND LIKE VEHICLES

[76] Inventor: Richard L. Weir, 2217 Grant St., Dayton, Ohio 45406

[21] Appl. No.: 184,790

[22] Filed: Sep. 8, 1980

[51] Int. Cl.³ ............................................. B60Q 5/00
[52] U.S. Cl. .............................. 340/52 R; 340/52 H; 340/669; 200/61.45 R
[58] Field of Search ............... 340/52 R, 52 D, 52 H, 340/53, 61, 669, 671, 65, 689; 200/61.45 R, 61.52, 61.44, 61.46

[56] References Cited

U.S. PATENT DOCUMENTS

| | | | |
|---|---|---|---|
| 1,611,749 | 12/1926 | Himmelman | 200/61.45 R |
| 2,075,040 | 3/1937 | Kieber | 340/52 H |
| 2,947,830 | 8/1960 | Goss | 340/65 |
| 3,562,706 | 2/1971 | Mason | 340/65 |
| 3,699,515 | 10/1972 | Barnett | 340/65 |
| 3,763,484 | 10/1973 | Byers | 340/52 H |
| 3,798,593 | 3/1974 | Sartor | 340/52 H |
| 3,798,594 | 3/1974 | Funk | 340/52 H |
| 3,975,722 | 8/1976 | Adler et al. | 340/52 H |

*Primary Examiner*—Alvin H. Waring
*Attorney, Agent, or Firm*—Jerome P. Bloom

[57] ABSTRACT

A device for use in automotive vehicles for alerting the driver to improper and/or unsafe driving patterns comprising means defining a normally open circuit and means for automatic closure of said circuit in response to a relatively abrupt change in a driving pattern, said circuit embodying therein a signalling means energized upon the closure of said circuit.

13 Claims, 14 Drawing Figures

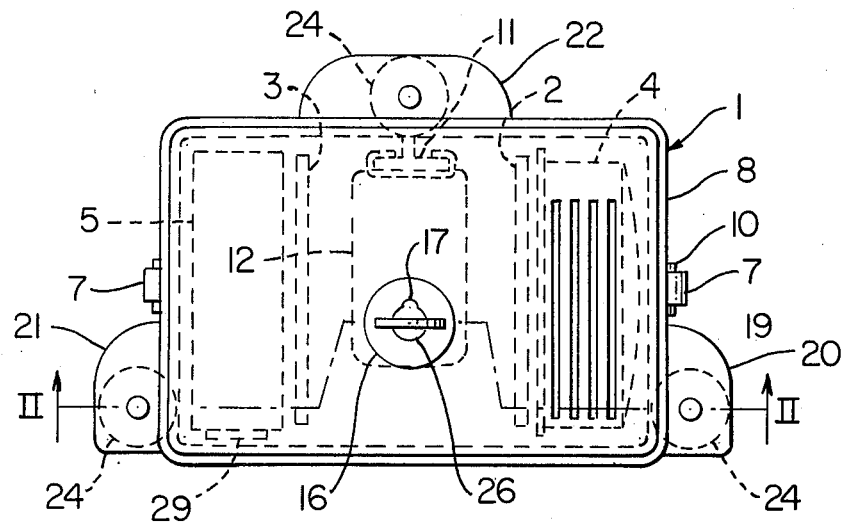
FIG. I
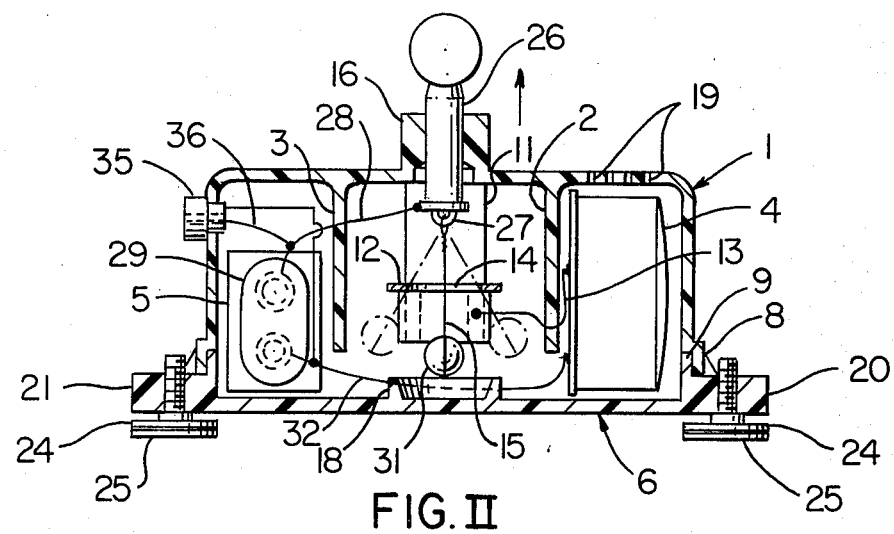
FIG. II
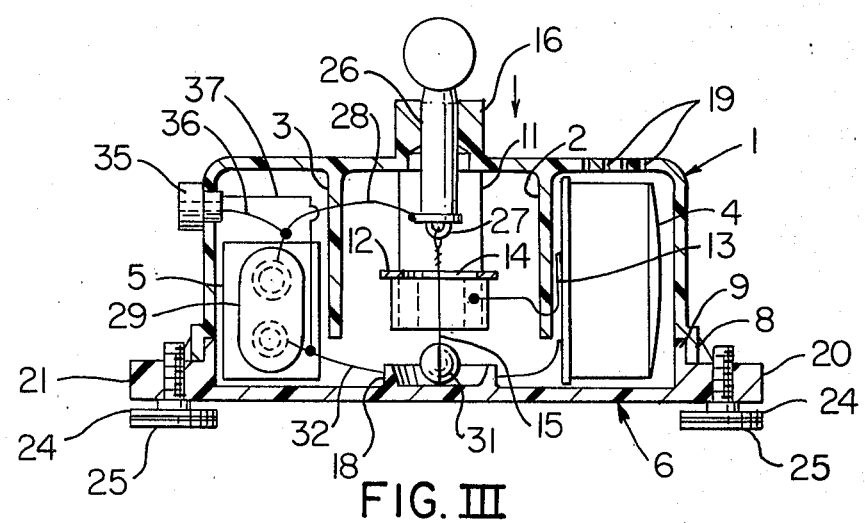
FIG. III

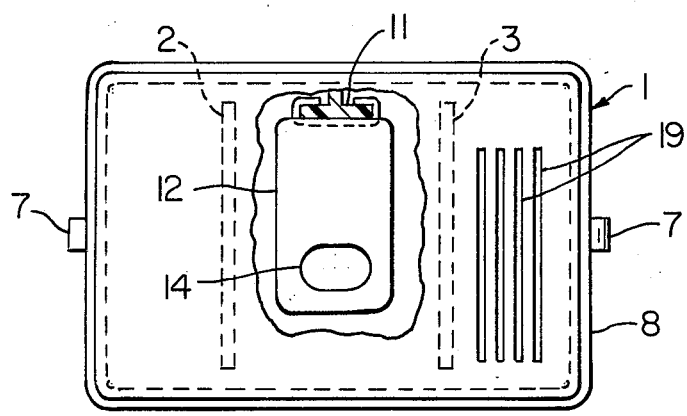
FIG. IV
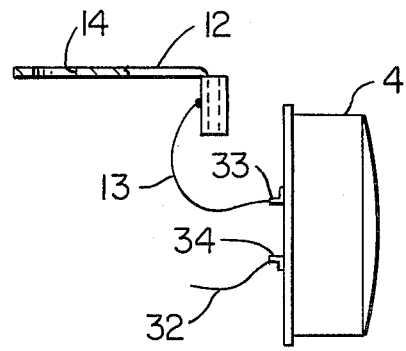
FIG. VI
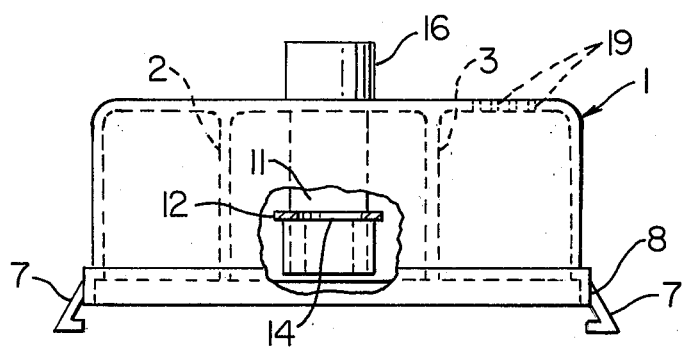
FIG. V
FIG. VIII
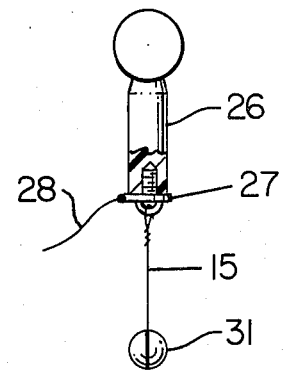
FIG. VII
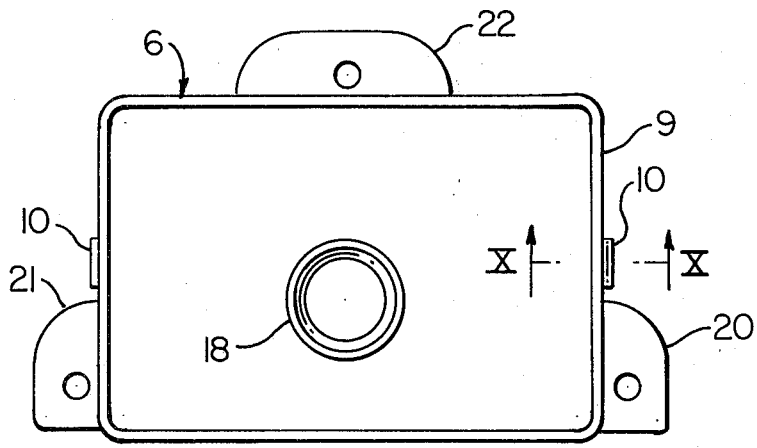
FIG. IX
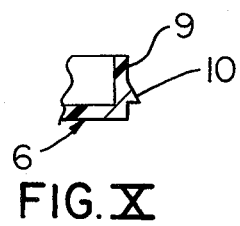
FIG. X

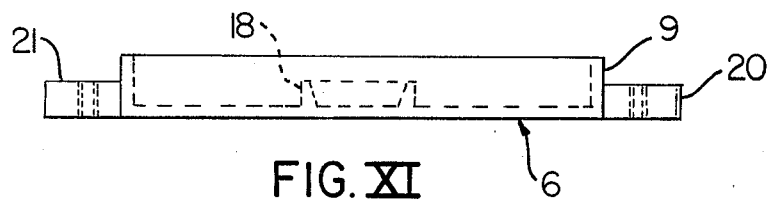
FIG. XI
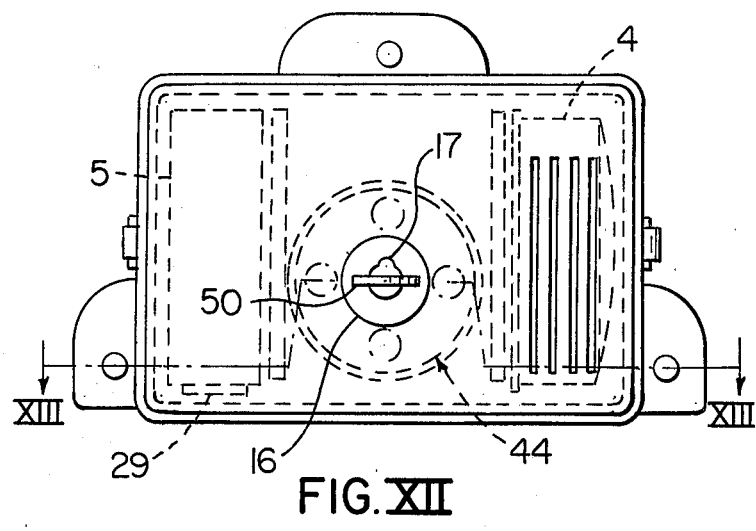
FIG. XII
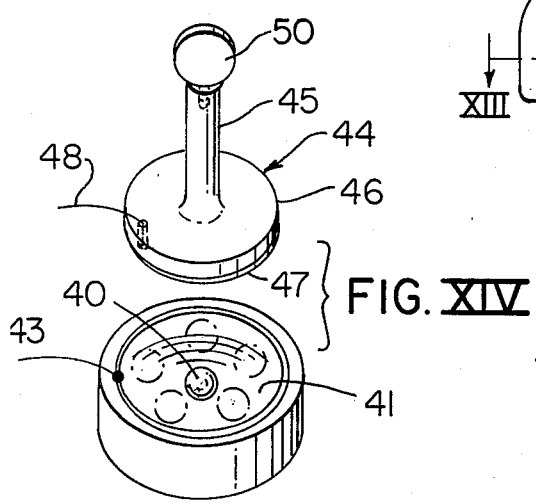
FIG. XIV
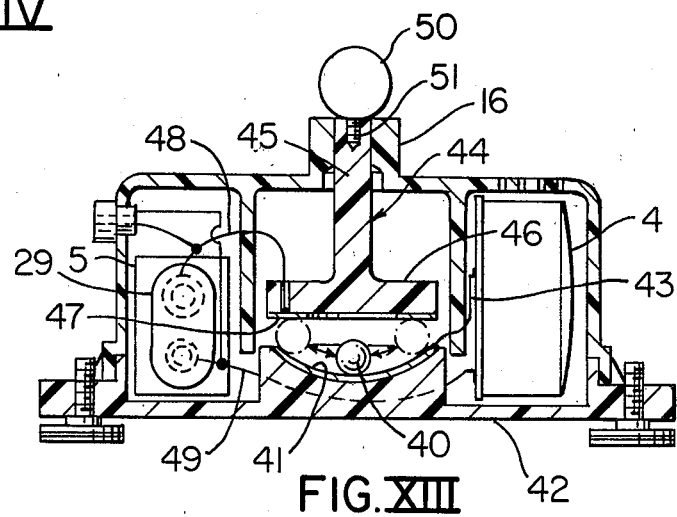
FIG. XIII

SIGNALLING DEVICE FOR USE IN AUTOMOTIVE AND LIKE VEHICLES

BACKGROUND OF THE INVENTION

The present invention relates to devices for use in automotive vehicles to alert drivers to bad and dangerous driving habits. Use of the invention embodiments produces an awareness not only of bad driving habits but of means and methods for reducing the use of fuel in the operation of an automotive vehicle. Embodiments signal frequency and extent of acceleration and braking and sudden and dangerous turns, as well as excessive speed in the process of turning corners. They feature a ready and simple means for setting parameters within which a driver should function.

The present inventor has no knowledge of any prior art which is specifically pertinent to the substance and application of the present invention and the only prior disclosure of which he is aware is that forming the subject matter of his disclosure document No. 089363 which he filed in the U.S. Patent and Trademark Office on Mar. 24, 1980.

SUMMARY OF THE INVENTION

An embodiment of the present invention has a self-contained source of power and in connection therewith means defining a normally open circuit in which is incorporated a device capable of emitting an audible signal. The circuit is closed by means conditioned to respond to erratic or non-uniform movements and sudden acceleration or deceleration of the vehicle in which the invention unit is embodied, thereby to create an audible signal. Frequent such signals should make the driver realize the errors in his or her driving performance.

Preferred embodiments, as will be seen, utilize the principle of inertia in the construction and function of their circuit closing means.

An embodiment of the invention is in any case simple to fabricate, efficient and satisfactory in use and adaptable to a wide variety of applications.

As herein disclosed, the invention units are designed to mount on the dash of a vehicle. It should be readily seen, however, that neither their application nor placement, nor the form of their embodiment, should be considered as so limited. Such is not intended.

It is a primary object of the invention to provide a self-contained operative unit which may be applied in an automobile to serve to alert the driver to dangerous and costly driving habits.

Another object is to provide a unit for alerting the driver of an automotive vehicle of dangerous speed change and turn patterns including means defining a normally open circuit having in connection therewith a source of power and means responsive to sudden and abrupt movements of the vehicle in which it is embodied to close said circuit and power means embodied therein to issue an audible signal.

An additional object is to provide a device to alert the driver of an automotive vehicle of poor driving performance and waste of fuel including means defining a normally open circuit in connection with the self-contained source of power wherein said circuit embodies a unit capable of emitting an audible signal and electrically conductive means arranged to move freely to and from a circuit closing position in accordance with the performance of the driver.

A further object of the invention is to provide apparatus possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawings wherein is shown one but obviously not necessarily the only form of embodiment of the invention, FIG. I is a plan view of a unit per the present invention;

FIG. II is a vertical section taken on line II—II of FIG. I, showing the embodied circuit closing structure in its operating position;

FIG. III is a sectional view like that of FIG. II showing the circuit closing structure in an inoperative position;

FIG. IV is a view like that of FIG. I with certain parts eliminated for clarity of disclosure and broken away to reveal details of the contactor plate which forms part of the circuit closing structure;

FIG. V is a side elevation view of the apparatus shown in FIG. IV;

FIG. VI is a diagrammatic, fragmentary, view showing a conductive wire connecting the contactor plate illustrated in FIGS. IV and V with a standard commercial buzzer, also embodied in the invention unit illustrated;

FIG. VII is a detail view of a portion of the circuit closing apparatus illustrated in FIGS. II and III;

FIG. VIII is a top view of the apparatus of FIG. VII, shown partly in section;

FIG. IX is a plan view of the base of the housing forming part of the unit illustrated in FIGS. I-V;

FIG. X is a view taken on line X—X of FIG. IX;

FIG. XI is a side elevation view of the base;

FIG. XII is a plan view of a modified version of the unit of FIGS. I through XI;

FIG. XIII is a view taken on line XIII—XIII of FIG. XII; and

FIG. XIV is an exploded view of circuit closing apparatus forming part of the unit of FIGS. XII and XIII.

Like parts are indicated by similar characters of reference throughout the several views.

Referring to FIGS. I-XI, a cap 1 having a rectangular cup-like configuration is inverted as it applied to a base 6 to form therewith a shell-like housing of non-conductive plastic material. Base 6 has a rectangular cup-like configuration also, including a central, rectangular, plate-like portion rimmed at one face, which forms a portion of the inner wall surface of the housing, by a shallow, integral, perpendicularly projected wall 9. The base edge portion of the wall 9 is rimmed, in turn, by an integral external flange 8.

The depth of flange 8 is less than that of the wall 9 and it is formed to include three triangularly positioned outwardly projected, co-planar ears 20, 21 and 22. Each ear has a tapped aperture through which projects the threaded body of a screw of bolt 24 the expanded head end of which positions below the base 6 and mounts an adhesively applied pad 25.

The screws 24 serve as supports for adjustably mounting the housing (6, 1) within a vehicle, for example on the dash thereof.

The dimension and configuration of the cap 1 is such that in its application to the base 6 the lip of its cup form fits snugly about the wall 9 as it abuts and seats firmly to the flange 8. Tapered lugs 10 integral with and projected from the flange bounding the wall 9 are engaged by complementarily shaped flexible snap over lugs 7 formed integral with the lip of the cap, at opposite sides thereof. The cap 1 is thus releasably fixed to the base 6 to seal their contents.

The wall of cap 1 outermost from and parallel to the base 6 is provided with an integral boss 16 (FIG. II). The boss 16 has a cylindrical, tubular configuration providing it with a central bore in which is press fit a solid cylindrical body 26 of non-conductive material. The central surface of the base 6 facing inwardly of the housing has an integral ring-like projection 18. The projection 18 is coaxially aligned with the central bore of the boss 16 and its inner peripheral wall is shaped to diverge in the direction of the boss.

A "T" shaped flange 11 is formed integral with and extends vertically of one side wall portion of the interior of the housing, provided by the back wall of cap 1 as seen in FIGS. II and III, and projected perpendicular thereto and inwardly of the chamber which the cap defines with the base 6. The head of the flange 11 is innermost of the housing and parallel to the wall from which it projects.

A plate 12 of electrically conductive material mounts perpendicular to the head of the flange 11 by having one end thereof bent at right angles to its main body portion and wrapped around and frictionally engaged to and about the opposite lateral extremities of the flange head. As may be seen, the main body portion of the plate 12 may be adjusted vertically of the flange head and frictionally fixed at any vertical elevation between and parallel to the inner surface of the base 6 and the facing surface of the cap 1.

The body 26 is normally arranged to project from either end of the bore of the boss 16. Its outermost end is extended by a disc-like projection which may be grasped for its axial adjustment. It also has a narrow hemi-cylindrical protrusion extending the length thereof which keys into a matching groove 17 in the inner wall of the boss 16, thereby to preclude a relative rotative movement of the body 26 with reference to the boss. The innermost end of the body 26 has a tapped recess in its center in which is threadedly engaged the body of a flanged ring screw 27. In the application of the screw 27 its flange abuts the inner end of the body 26 and its eye or ring portion positions innermost of the cap, in line with the center of the ring 18.

An electrically conductive wire 15 has one end looped through and engaged to the eye of the screw 27 while its opposite end is threaded through a diametral aperture of a ball type weight 31. The wire 15 is knotted in conventional manner to prevent its disengagement from the ball 31, in use thereof.

As the wire 15 depends from the screw 27 and body 26, it passes through the center of an oval aperture 14 formed in the plate 12 and is thereby spaced from its bounding wall structure. In the normal operative position of the wire 15, the ball 31 is clear of, in a spaced relation to and aligned with the center of the ring 18.

The interior of the housing formed by the cap 1 and base 6 is, in effect, divided into three compartments by plate-like panels or partitions 2 and 3 formed integral with and projecting perpendicular to the inner surface of the base portion of the cap. Panels 2 and 3 terminate short of the base 6. The body 26 and its attachments depend centrally of the middle compartment and in a spaced relation to the bounding panels 2 and 3. A further compartment is defined outwardly of each of the panels in one of which is mounted a standard commercial buzzer 4 and in the other of which is mounted a commercial battery 5. Slots 19 are provided in a portion of the cap 1 over the buzzer compartment to facilitate sound emission.

Soldered or otherwise conductively attached to the plate 12 is one end of a conductive wire 13 the opposite end of which extends therefrom to one terminal of the buzzer 4. A second wire 32 connected to the other terminal of the buzzer extends therefrom to connect to the negative post or terminal of the battery 5.

The flange of the screw 27 which is electrically conductive has one end of a conductive wire 28 connected thereto the opposite end of which connects to the positive terminal of the battery 5.

As will be seen, the various wiring and the electrically conductive elements with which they interconnect provide a normally open circuit, the source of energy for which is provided by the battery 5. To close this circuit, wire 15 must engage a sidewall portion of the aperture 14 in the plate 12 which bounds the wire.

It will be obvious that should the device described be installed for use, for example on the dash of an automotive vehicle, the padded heads of the screws 24 will serve as its base. Screws 24 will be so adjusted that the element 26 and wire 15 are vertically oriented. Such being the case, when the vehicle is driven, should the driver be erratic as to the pressure which he applies through his foot to the accelerator or should the driver engage in unnecessary and untimely braking of the vehicle or should the driver in fact produce any motion of the vehicle which is non-uniform or engage in sharp and dangerous turns in guiding the vehicle, the pendulum effect of the weighted ball 31 on the wire 15 will cause it to swing outwardly from it original position to a sufficient degree to make contact with the plate 12, thereby to complete a circuit alerting the driver to the improper procedure which has taken place. As may be seen, if the driver is indeed a poor driver, the buzzer will sound so frequently as to produce an awareness of the driving performance and the need for its correction. At the same time, the driver will be also alerted to the fact that the driving performance is such in many instances to waste fuel. Apart from this, in the use of the invention device in driving a vehicle, the driver will become aware of many dangerous practices on his or her part. The invention device is therefore not only one to caution the driver at moments when the driver succumbs to a dangerous impulse but to induce the driver to watch more closely his or her driving habits, to the benefit of not only the driver but also of the public and other drivers who commonly share the same roads.

Note that in FIGS. I through XI a two wire adapter 35 is diagrammatically shown as mounted in one side of the cap 1. One wire 36 of this adapter is coupled to the wire 28 and thereby to one terminal of the battery 5 as well as the flange of the screw 27. The second wire 37 of the adapter is connected to the wire 32 and thereby to the buzzer 4 and the other terminal of the battery 5. This arrangement is to facilitate the application to the circuit embodied in the invention unit of an external source of power, should the same be required.

Sliding of body 26 upward or downward in the boss 16 will change the phase relation of the movements of the wire 15 with respect to plate 12 and therefore the sensitivity of response of the invention apparatus. This facilitates a change in the parameters which may be set into the invention unit to guide or caution the driver with respect to the parameters within which the vehicle should be operated, in the respects noted.

Note that aperture 14 may be other than oval. Also wire 15 may not extend exactly through the center of the aperture 14 in all cases. The position of the wire will be made such to take into account the differences in inertia generated in normal acceleration, braking and turning functions of the vehicle in which the apparatus is embodied.

One may substitute for the buzzer 4 other signalling devices such as a light or a blinking light unit. However, this is certainly not preferred. The audible signalling means is much more effective and efficient for use in signalling the conditions herein described.

One may, if desired, deactivate the unit of the invention by adjusting the axial position of the body 26 until the ball 31 is dropped into the cup defined within the bounds of the ring 18 on the inner face of the base 6.

FIGS. XII through XIV of the drawings present a modified version of FIGS. I through XI, differing only in the composition of the apparatus provided to complete the circuit to energize the buzzer 4. In this case rather than the body 26, there is press fit in the boss 16 a shaft 45. The shaft 45 is keyed to the boss by means of a hemi-cylindrical protrusion the length thereof which fits in a complementary groove 17 in the inner wall of the boss. The outermost end of the shaft 45 is axially extended by a disc 50 similar to that provided in connection with the body 26 for its axial adjustment. The innermost end of the shaft 45 is attached to the center of a transversely disposed disc 46. The shaft 45 and disc 46 are formed, as illustrated, of non-conductive material. Attached to the bottom of the disc 46 is a flat ring 47 of electrically conductive material.

The only other difference in the unit of FIGS. XII through XIV from that first described is that the ring 18 is replaced by a cylindrical projection of non-conductive material directed inwardly and upwardly of the central compartment of the unit. The upper and innermost surface of this projection lies in adjacent but spaced relation to the innermost face of the ring 47 and in a directly opposed relation thereto. The innermost or upper surface of the projection is distinguished by a recess formed on a relatively large uniform radius which is lined by an electrically conductive plate 41, the uppermost limits of which are in directly facing relation to the ring 47.

Mounted to freely move on the upper surface of the plate 41 is a ball 40 of electrically conductive material. As will be seen, in erratic movements of the operation of an automotive vehicle in which the device of FIGS. XII through XIV is applied, the ball 40 will float freely on the cup surface of the plate 41 and if the erratic and sudden movements of the vehicle are sufficient it will bridge the conductive surface of the plate 41 and the ring 47 to complete the circuit powered by the battery 5. As will be obvious, when the circuit is completed the buzzer will sound and the unit will function as in the embodiment first described. The wiring provided for the circuit of the embodiment of FIGS. XII through XIV is comprised of a conductive wire 48 connecting between the plate 47 and one of the terminals of the battery 5, a conductive wire 43 connecting between one of the terminals of the buzzer and the plate 41 and a further wire 49 connecting between the second terminal of the buzzer and the other battery terminal. The two wires of the adapter to provide an external source of power when required are respectively coupled into the wires 48 and 49 as may be seen from FIG. XIII of the drawings.

In each of the embodiments illustrated, the primary circuit closing element consisting of the wire 15 in the one case and the ball 40 in the other in effect will float and move by virtue of inertia or centrifugal force to achieve a circuit closing position. There is no lost motion and there is a direct and positive closure of the circuit in each instance when the driver should be alerted.

There obviously may be other circuit closing means than of the nature illustrated wherein a conductive element will swing or float to and from a circuit closing position. Such is fully comprehended within the spirit and the scope of the present invention as defined in the attached claims. The floating means for achieving a closure of the circuit provided may even be in the form of a suitably contained ball or mass of mercury. However, for simplicity and assurance in performance, embodiments of the nature of that herein disclosed are preferred.

The advantages of the invention should be clear from the foregoing and it should be self-evident that on any erratic condition of driving, whether in acceleration or braking in frequent patterns or turning at excessive speeds or in improper manner there will be an inertia effect on the circuit closing element or elements producing an alerting of the driver which is free from delay. Not only will a driver be promptly alerted but he will be made quite aware of his deficiencies in operation and that they are a source of waste as far as fuel is concerned. The shaft 45 in the embodiment of FIGS. XII to XIV may be axially adjusted in obvious manner for reasons as made clear with reference to the body 26.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. A device for use in automotive vehicles for alerting the driver to improper and/or unsafe driving patterns, including a housing adapted to be mounted on a vehicle, a mechanism within said housing sensing driving excesses and signalling the occurrence of such excesses, at least a portion of said mechanism having means in connection therewith for the manipulation thereof to vary the sensitivity of the response of said mechanism to said excesses to suit driving conditions and individual driver requirements, and said manipulating means being exterior to said housing, facilitating its operation.

2. A device according to claim 1, wherein said mechanism is constructed and arranged to respond to and signal excessive speed in turns and excessive changes in speed in travel.

3. A device according to claim 1 characterized in that said portion of said mechanism which is manipulatable includes an element a portion of which has a friction fit mount which accommodates a change of its position in correspondence with a change of position of said manipulating means, and further means within said housing which is effective in one position of said element to deactivate said mechanism.

4. A device according to claim 1, wherein said portion of said mechanism includes a component thereof which projects through and is mounted in connection with a wall portion of said housing, and a weight suspended from an inner end of said component within said housing by an electrically conductive wire, said mechanism further includes means presenting an electric conductor for contact by said wire on the occurrence of a predetermined amount of relative swinging motion of said weight, said component being selectively adjustable as to its position with respect to the wall portion of said housing through which it projects and a further portion of said housing providing means into which said weight is projected in one position of said component to deactivate said mechanism.

5. A device according to claim 1 wherein said mechanism comprises an inertia responsive means, a battery means and a sound emitting means, all in respective compartments in said housing to define a self-contained driver alerting device, said portion of said mechanism for varying the sensitivity of its response to said excesses including said inertia responsive means and having a part thereof projected through a wall of said housing from the compartment containing said inertia responsive means to directly connect to said manipulating means which is manually controllable.

6. A self-contained device for use in automotive vehicles for alerting the driver to improper and/or unsafe driving patterns, including a housing accommodating an energy source, a signalling means and an inertia responsive means, said inertia responsive means including normally separated electrical conductors and an inertia controlled weighted element for producing a closing of a circuit including said conductors to energize said signalling means, one of said normally separated electrical conductors being connected to a support a portion of which projects inwardly from a wall portion of said housing and has in connection therewith means for the manipulation thereof for selectively changing its position, said manipulating means being located exterior to said housing and the other of said conductors occupying a position in said housing normally spaced from the one said conductor.

7. A device according to claim 6, wherein said portion of said support includes a part thereof which is non-conductive and slidably mounted in the said wall portion of said housing, which in the use of said device is an upper wall portion of said housing, and said slidably mounted part of said support is slidably adjustable in a vertical direction through the medium of said manipulating means.

8. A device according to claim 6, wherein said portion of said support having in connection therewith said manipulating means is a non-conductive member mounted for vertical sliding adjustment in and with reference to said wall portion, which is an upper wall portion of said housing, to vary the sensitivity of response of the device by raising and lowering said weighted element relative to said other of said conductors and to deactivate the device by lowering the weighted element to a seat on a lower wall portion of said housing.

9. A device according to claim 6, wherein said weighted element is an extension of an electrically conductive wire forming another part of said support, and said other conductor includes a plate-like portion normally positioning substantially perpendicular to said wire and providing an aperture through which said wire passes.

10. A device according to claim 6 wherein the said other of said electrical conductors lines a concavity in what constitutes a lower interior wall portion of said housing as it is disposed in use and said one electrical conductor positions in a horizontal plane in overlying spaced relation to said concavity, and said weighted element is a metal ball freely rolling on the surface of said concavity and in a course of a rolling motion thereof, determined by the spacing of said conductors, bridging said conductors.

11. A device according to claim 10, wherein said one electrical conductor is a plate-like element on a lower end of said support which is slidably adjustable in an upper wall portion of said housing under the influence of said manipulating means to vary the distance thereof from the other of said conductors whereby to vary the sensitivity of response of said device.

12. A device according to claim 1 wherein said portion of said mechanism to vary the sensitivity of its response to said excesses includes a weight suspended within said housing by an electrically conductive wire, said mechanism further including an electrically conductive plate having an aperture through which said wire passes, said weight, on the occurrence of sufficient applied inertial forces, moving to engage said wire with an edge portion of said aperture, said aperture having a non-circular configuration and the relative position of said wire in relation to the bounding edge portion of said aperture in the normally inoperative condition of said device being such to allow said wire greater freedom of motion in one direction than in another.

13. A device according to claim 12 wherein the configuration of the edge of said aperture and the position of said wire relative thereto being selected to take into account differences in inertia generated in acceleration, deceleration and turning of a vehicle in its use.

* * * * *

UNITED STATES PATENT AND TRADEMARK OFFICE
CERTIFICATE OF CORRECTION

PATENT NO. : 4,345,238
DATED : August 17, 1982
INVENTOR(S) : Richard L. Weir

It is certified that error appears in the above—identified patent and that said Letters Patent is hereby corrected as shown below:

Col. 2, line 66, "of" (2nd occurrence) is corrected to read -- or --.

Col. 4, line 43, "it" (2nd occurrence) is corrected to read -- its --.

Signed and Sealed this

Twenty-sixth Day of October 1982

[SEAL]

Attest:

GERALD J. MOSSINGHOFF

Attesting Officer

Commissioner of Patents and Trademarks